(12) United States Patent
Jagannath et al.

(10) Patent No.: US 10,721,162 B2
(45) Date of Patent: Jul. 21, 2020

(54) ROUTING DATA THROUGH DISTRIBUTED COMMUNICATIONS NETWORK

(71) Applicant: Andro Computational Solutions, Rome, NY (US)

(72) Inventors: Jithin Jagannath, Oriskany, NY (US); Andrew Louis Drozd, Rome, NY (US); Anu Jagannath, Oriskany, NY (US); Sean Robert Furman, Vernon, NY (US); Andrew Kurt Burger, Rome, NY (US)

(73) Assignee: Andro Computational Solutions, Rome, NY (US)

( * ) Notice: Subject to any disclaimer, the term of this patent is extended or adjusted under 35 U.S.C. 154(b) by 0 days.

(21) Appl. No.: 16/295,660

(22) Filed: Mar. 7, 2019

(65) Prior Publication Data

US 2019/0280966 A1 Sep. 12, 2019

Related U.S. Application Data

(60) Provisional application No. 62/640,121, filed on Mar. 8, 2018.

(51) Int. Cl.
*H04L 12/26* (2006.01)
*H04L 12/721* (2013.01)
(Continued)

(52) U.S. Cl.
CPC ......... *H04L 45/44* (2013.01); *H04B 7/18506* (2013.01); *H04L 41/0668* (2013.01);
(Continued)

(58) Field of Classification Search
USPC ....... 370/229, 230, 241, 248, 252, 255, 311, 370/328, 351, 352, 355, 389, 396, 395.21,
(Continued)

(56) References Cited

U.S. PATENT DOCUMENTS

2004/0190451 A1* 9/2004 Dacosta ................ H04L 1/0003
370/230
2009/0274093 A1* 11/2009 Senouci .................. H04L 45/06
370/328

(Continued)

*Primary Examiner* — Nguyen H Ngo
(74) *Attorney, Agent, or Firm* — Hoffman Warnick LLC

(57) ABSTRACT

Embodiments of the present disclosure relate to routing data through a distributed communications network (DCN) including several communication devices. Each communication device may include or be in communication with a computing device which causes the communication device to perform actions including: calculate a utility score for a subset of the plurality of communication devices, the utility score quantifying transmissibility of a data packet from the transceiver assembly to another communication device. The utility score may be calculated based on: a distance between the transceiver assembly and the communication device, a transmission queue at the transceiver assembly, a remaining life of the power source, a power consumption to transmit the data packet to the communication device, and a data throughput of the communication device. The computing device may generate instructions to transmit the data packet to at least one communication device in the subset, based on the calculated utility score.

20 Claims, 8 Drawing Sheets

(51) Int. Cl.
  *H04B 7/185*   (2006.01)
  *H04L 12/24*   (2006.01)
  *H04L 12/733*  (2013.01)
  *H04L 12/861*  (2013.01)
  *H04W 40/10*   (2009.01)

(52) U.S. Cl.
  CPC ........ *H04L 43/062* (2013.01); *H04L 43/0888* (2013.01); *H04L 45/122* (2013.01); *H04L 49/90* (2013.01); *H04W 40/10* (2013.01)

(58) Field of Classification Search
  USPC .......................................................... 370/400
  See application file for complete search history.

(56) References Cited

U.S. PATENT DOCUMENTS

| | | | |
|---|---|---|---|
| 2012/0238263 A1* | 9/2012 | Caretti | H04W 16/10 |
| | | | 455/426.1 |
| 2013/0044691 A1* | 2/2013 | Stanwood | H04L 47/20 |
| | | | 370/328 |
| 2018/0103059 A1* | 4/2018 | Kurakami | H04L 63/1458 |
| 2018/0270728 A1* | 9/2018 | Van Oost | H04W 76/15 |
| 2019/0260464 A1* | 8/2019 | Roy | H04B 7/18563 |

* cited by examiner

ROUTING DATA THROUGH DISTRIBUTED COMMUNICATIONS NETWORK

BACKGROUND

Technical Field

Embodiments of the disclosure provide an apparatus and/or system for routing data through a distributed communications network, e.g., during an emergency when other networks are not available.

Related Art

In the past year, the United States of America was hit with several devastating Hurricanes. Similar natural and man-made disasters (simply "disasters" hereafter) constitute unpredictable events which may inflict substantial damage on various types of infrastructure. Communication networks are one type of infrastructure which may suffer damage or become inoperable in a disaster area. It is desirable for all emergency responders and affected individuals to be equipped with wireless communication technologies to maintain connectivity, during a disaster and after its conclusion, to facilitate rescue and recovery efforts in the affected areas. Conventional systems fail to offer a disaster-resistant communications network, for example because an entire network may be disabled when a minority, or in some cases only one, component in the network infrastructure is disabled.

SUMMARY

A first aspect of the disclosure provides a communications apparatus for a distributed communications network (DCN) having a plurality of communication devices, the communications apparatus including: a transceiver assembly including: a short-range transceiver configured to generate a local area network (LAN) for exchanging communications data between the transceiver assembly and at least one LAN device; a long-range transceiver configured to connect the transceiver assembly to a subset of the plurality of communication devices; a power source coupled to the transceiver assembly; and a computing device connected with the transceiver assembly and configured to: calculate a utility score for the subset of the plurality of communication devices, wherein the utility score quantifies transmissibility of a data packet from the transceiver assembly to each communication device and is based on: a distance between the transceiver assembly and each neighboring communication device, a transmission queue at each transceiver assembly, a remaining life of the power source, power consumption to transmit the data packet to each communication device, and a data throughput of each communication device, and generate instructions to transmit the data packet to at least one communication device in the subset based on the calculated utility score.

A second aspect of the disclosure provides a network gateway for a distributed communications network (DCN) having a plurality of communication devices, the network gateway including: a long-range transceiver configured to connect the plurality of communication devices within the DCN, each of the plurality of communication devices being configured to transmit data packets to a respective subset of the plurality of communication devices; and a computing device connected with the long-range transceiver for transmitting parameters of a data routing algorithm to the plurality of communication devices, wherein the data routing algorithm performs actions including: calculate a utility score for each communication device in the respective subset, wherein the utility score quantifies transmissibility of a data packet from the transceiver assembly to each communication device and is based on: a distance between the transceiver assembly and each communication device, a transmission queue at each transceiver assembly, a remaining life of the power source, power consumption to transmit the data packet to each communication device, and a data throughput of each communication device, and generate instructions to transmit the data packet to at least one communication device in the subset based on the calculated utility score.

A third aspect of the disclosure provides a system for routing data through a distributed communications network (DCN), the method including: a plurality of communication devices distributed over a geographic area, each of the plurality of communication devices including: a short-range transceiver configured to generate a local area network (LAN) for exchanging communications data between the transceiver assembly and at least one LAN device; a long-range transceiver configured to connect the transceiver assembly to a subset of the plurality of communication devices of the DCN; a power source configured to supply power to the short-range transceiver and the long-range transceiver; a network gateway in communication with at least one communication device within the DCN, at least one communication device being configured to transmit data packets to a respective subset of the plurality of communication devices; and a computing device connected to the network gateway for transmitting parameters of a data routing algorithm to the plurality of communication devices, wherein the data routing algorithm performs actions including: calculating a utility score for the subset of the plurality of communication devices, wherein the utility score quantifies transmissibility of a data packet from the transceiver assembly to each communication device and is based on: a distance between the transceiver assembly and each communication device, a transmission queue at each transceiver assembly, a remaining life the of power source, power consumption to transmit the data packet to each communication device, and a data throughput of each communication device, and generating instructions to transmit the data packet to at least one communication device in the subset based on the calculated utility score.

BRIEF DESCRIPTION OF THE DRAWINGS

The embodiments of this disclosure will be described in detail, with reference to the following figures, wherein like designations denote like elements, and wherein.

Figure 1:
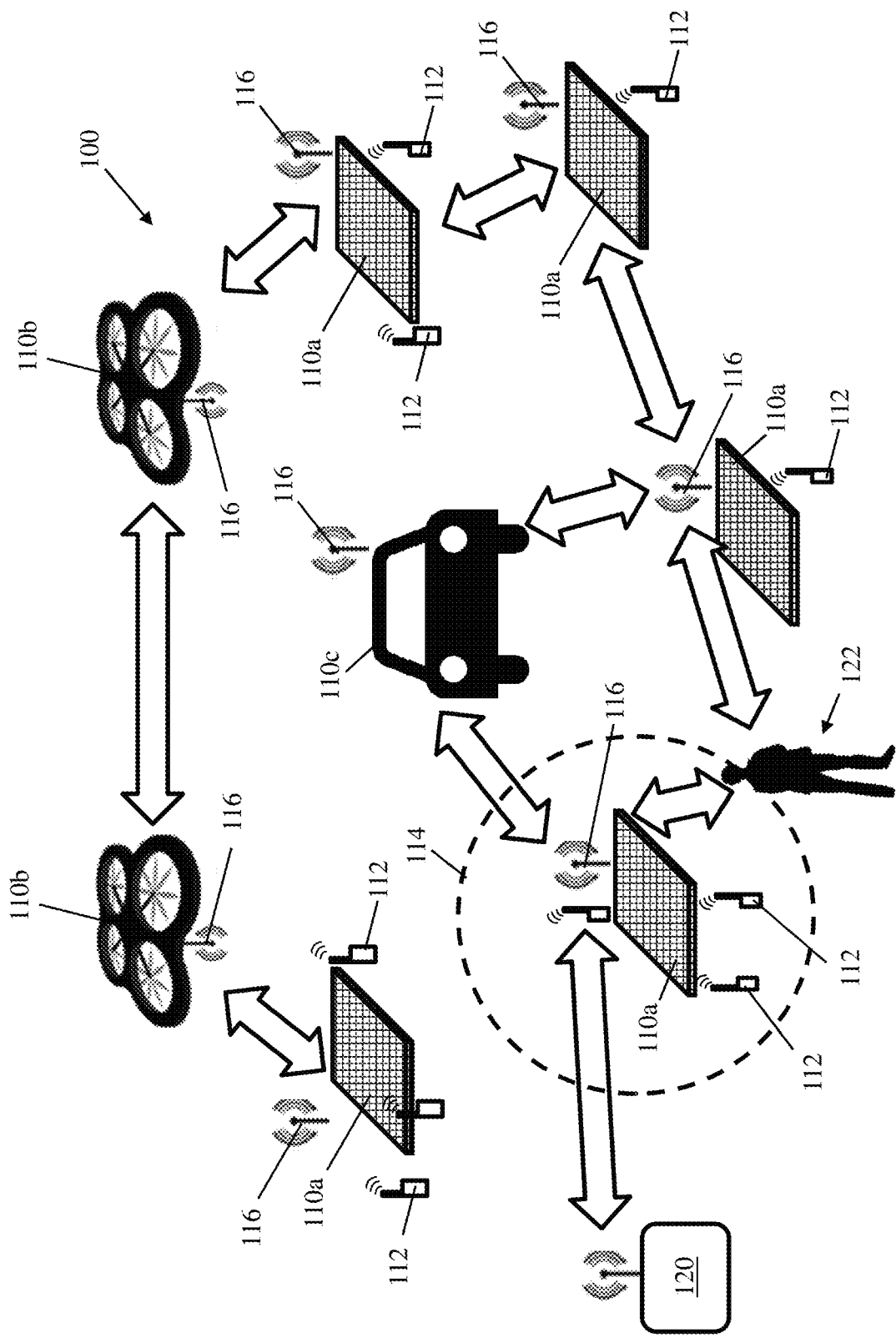
FIG. 1 shows a schematic view of a distributed communications network according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Embodiments of the disclosure provide an apparatus, network gateway, and system for managing communication over a distributed communications network (DCN), i.e., one or more communications networks composed of multiple types of communication hardware at various positions over a geographic area. A single device for communicating over the DCN may be identified as a "transceiver assembly." A collection of transceiver assemblies connected to at least one other transceiver assembly, and capable of passing data from the transceiver assembly to other transceiver assemblies in the same DCN, may be known collectively as "communication devices." Thus, a single device may be identified as a transceiver assembly when sending or receiving data at a distinct location, but may simultaneously be identified as a candidate communication device for one or more transceiver assemblies located elsewhere in the DCN. Multiple examples of what may constitute a transceiver assembly are provided herein. In various embodiments, the disclosure may be implemented via a radio network (including hardware and communication protocols) as well as supporting software (e.g., applications provided through one or more mobile devices). Various embodiments may be configured to establish an independent, low cost, and/or lower power wireless network providing critical communication features during the aftermath of a disaster when a conventional power grid and/or communication channels are available.

In an example implementation, each household or facility in a disaster-affected area may have at least one network transceiver in its emergency kit, allowing a user to activate and use a network transceiver when other communication infrastructure is disrupted. Each network transceiver, along with individual devices (e.g., personal computers, tablets, wearable and non-wearable devices connected to a local network, and/or equivalent devices) operated by survivors, responders, etc., together may form a wireless ad hoc distributed communications network (DCN) connecting users among themselves and to a network gateway, alternatively known as a "emergency response center" (ERC) (when applicable) for managing communications over the DCN. A heterogeneous efficient low power radio network may be deployed in such scenarios.

During operation, each transceiver in DCN may execute a data routing algorithm to increase the network lifetime and versatility. As discussed herein, the data routing algorithm may work in tandem with distributed communication devices, network gateways, etc., to increase coverage over a disaster-affected area. An application interface, e.g., a mobile application (such as an app compatible with Android or iPhone mobile devices), or other application compatible with network-enabled computing devices may be provided that will enable users to seamlessly connect to the DCN to contact or receive communications from available critical services. In this manner, the proposed system helps the community in an effective area to provide a distributed communication network that provides critical services.

Referring to FIG. 1, a schematic view of a DCN 100 is shown according to embodiments of the disclosure. DCN 100 may include multiple communication devices 110 (also configured to operate as a transceiver assembly as noted above). Each communication device 110 may be separately identified via a predetermined category such as a stationary (i.e., non-moveable) transceiver 110a, an aerial transceiver 110b, a vehicle-based transceiver 110c. However embodied, each communication device 110 may represent a single communications node of DCN capable of communicating with other communication devices 110 and/or other components of DCN 100 as noted herein. Communication devices 110 in one example may be configured for wireless radio frequency (RF) communication over some or all of the geographic area where DCN 100 is used.

Each communication device 110 may include wireless fidelity (Wi-Fi), hardware for enabling communication with and/or between local area network (LAN) devices within a single LAN area 114. Although one LAN area 114 is shown in FIG. 1, it is understood that each individual communication device 110 may generate a respective LAN area 114. Wi-Fi infrastructure may be particularly suitable for creating LAN area 114 for communication device 110, as Wi-Fi offers a mid-sized network area (i.e., up to approximately three-hundred foot radius) for interconnecting LAN devices 112. Embodiments of the disclosure may integrate a first type of network infrastructure (e.g., Wi-Fi as noted above) with a second, distinct type of network infrastructure configured to allow communication over larger distances (e.g., several miles as compared to several-hundred feet). Each communication device may include, e.g., a long-range transceiver 116 for establishing communication between communication devices 110 of DCN 100. In some cases, long-range transceiver 116 and/or a portion of communication device 110 may act as a short-range transceiver for permitting communication between LAN devices 112 within LAN area 114. In any case, long-range transceiver 116 may be provided in the form of an RF antenna, and/or any conceivable long-range transmission components (including RF hardware and/or other types of communication infrastructure) for transmitting data packets between communication devices 10 via DCN 100, and DCN 100 in turn may be a low-power wide-area network (LPWAN). According to one example, the LPWAN may be provided via the LoRaWAN™ specification or other proprietary, commercially-available technology for wireless data communication.

However embodied, the long-range transceiver 116 may enable low power, long range links to form DCN by cooperation between communication devices 110 and respective long-range transceivers 116. For this reason, each communication device 110 may be in a fixed position (i.e., "static") and mounted at the fixed position, and/or may be provided as part of one more mobile devices and/or components. However embodied, DCN 100 may be scalable, i.e., sized based on the number of communication devices 110 and/or other communications hardware in communication with each other. DCN 100 thus may not be dependent on conventional communications infrastructure, particularly where such infrastructure is damaged or unavailable during a disaster. In any case, a user once connected to DCN 100 may access various forms of data (e.g., maps, authority contact information, communications, and internet-enabled services based on availability of gateway) through communication devices 110. DCN 100 will also allow first responders to identify and locate survivors in an area solely through communication devices 110 included within DCN 100. DCN 100 may include a network gateway 120 connected to communication devices 110. Network gateway 120 may be embodied as any currently known or later developed component for providing an access point to external networking technology, and/or means for providing software updates and/or instructions to communication device 110 in the communications range of network gateway 120. For instance, network gateway may include one or more of, e.g., an emergency response center (ERC), a base station, control tower, server, transceiver assembly in communication with conventional networking infrastructure, and/or similar devices for providing access between DCN 100 and a different network. One or more users 122 of communication devices 110 may access DCN 100 through communication device(s) 110, e.g., via an application on communication device 110 and/or LAN device 112.

As noted elsewhere herein, each communication device 110 may take a variety of forms. Communication device 110 may include, e.g., a stationary transceiver 110a. Stationary transceiver(s) 110a in some cases may embody a majority of communication devices in one DCN 100. Stationary transceiver(s) 110a may operate in a fixed, or at least relatively fixed, location such as a household, hospital, roadside assembly, and/or other buildings without significant mobility. Stationary transceivers 110a may include or otherwise be coupled to one or more power sources for enabling operation of stationary transceivers(s) 110a without reliance on a conventional power grid or similar infrastructure. In an example, stationary transceivers(s) 110a may include or otherwise be coupled to a generator, battery, solar panel, wind turbine, and/or other power source for providing electrical energy on command. Where only temporary network accessibility is required (e.g., only a few minutes or hours), stationary transceiver 110a may offer smaller size and/or limited portability by changing the type of applicable power source. In one example, stationary transceiver(s) 110a may be configured to operate over at least one day without sunlight, or alternatively for multiple days in presence of continued sunlight.

Stationary transceiver(s) 110a may serve as a primary source of cached information (maps, emergency phone numbers etc.). Stationary transceiver(s) 110a may be capable of data caching to reduce transmission load, delays and energy consumption of the network. As noted herein, stationary transceiver(s) 110a may be capable of generating a LAN (e.g., via Wi-Fi) where LAN devices 112 (e.g., phones, tablets, PC or Laptops) can connect to DCN 100. In this case, stationary transceiver(s) 110a act as an access point for devices to communicate among themselves, and/or other users. Further details of each stationary transceiver 110a according to embodiments are shown and discussed relative to FIG. 2.

DCN 100 may also include one or more aerial transceivers 110b. Aerial transceivers 110b may allow for DCN 100 to traverse physical barriers between different zones in an affected area, e.g., disabled roadways and/or other pathways where people and/or electricity would otherwise travel. Aerial transceivers 110b thus may allow for communication to one or more stationary transceivers 110a that otherwise cannot be reached through other stationary transceivers 110a of DCN 100. Such isolation of one or more stationary transceivers 110a may arise from, e.g., disconnected or failed static transceivers 110a, disruptive channel conditions, uneven distribution of communication devices 110 in DCN 100, etc. FIG. 1, for example, shows two aerial devices 110b providing a communications link between one stationary transceiver 110a and other stationary transceivers 110a outside the communications range of the isolated stationary transceiver 110a.

Aerial transceivers 110b may be capable of identifying isolated stationary transceivers 110a to act as a temporary or intermediate connection between the isolated stationary transceivers 110a and other devices. In some cases, aerial transceivers 110b may be configured to upload information about users of isolated stationary transceivers 110a to DCN 100 for transmission to other static transceivers 110a and/or other destinations. Aerial transceivers 110b may also be capable of determining locations where new static transceivers 110a need to be deployed to repair disabled or destroyed portions of DCN 100. Aerial transceivers 110b may be more costly and less energy-efficient than stationary transceivers 110a (e.g., due to the energy consumption required for a sustained flight), but may be needed for scenarios where travel between an affected area is dangerous or impossible. In some cases, the aerial transceivers 110b may not be capable of generating a LAN over a particular area, and may be solely configured to communicate via long-range transceiver 116 (e.g., through a LPWAN as noted above).

DCN 100 may also include one or more vehicle-based transceivers 110c. Although one vehicle-based transceiver 110c is shown in FIG. 1 for the sake of example, it is understood that multiple vehicle-based transceivers 110c may be one DCN 100. According to an example, vehicle-based transceiver 110c may be provided as one or more radio units carried by vehicles and first responders or other members of search and rescue teams. Vehicle-based transceivers 110c do not necessarily require an independent or dedicated power source, and may rely on the vehicle itself to drive the operation of vehicle-based transceiver 110c. In an example implementation, this may provide vehicle-based transceiver 110c with up to approximately ten hours of operation. When a user of vehicle-based transceiver 110c uses device 110c as a transceiver assembly for accessing DCN 100, the corresponding web application may include a "First Responder" mode for updating the location of nearby survivors, e.g., to provide information regarding survivor health, position, status, etc., during an emergency.

Figure 2:
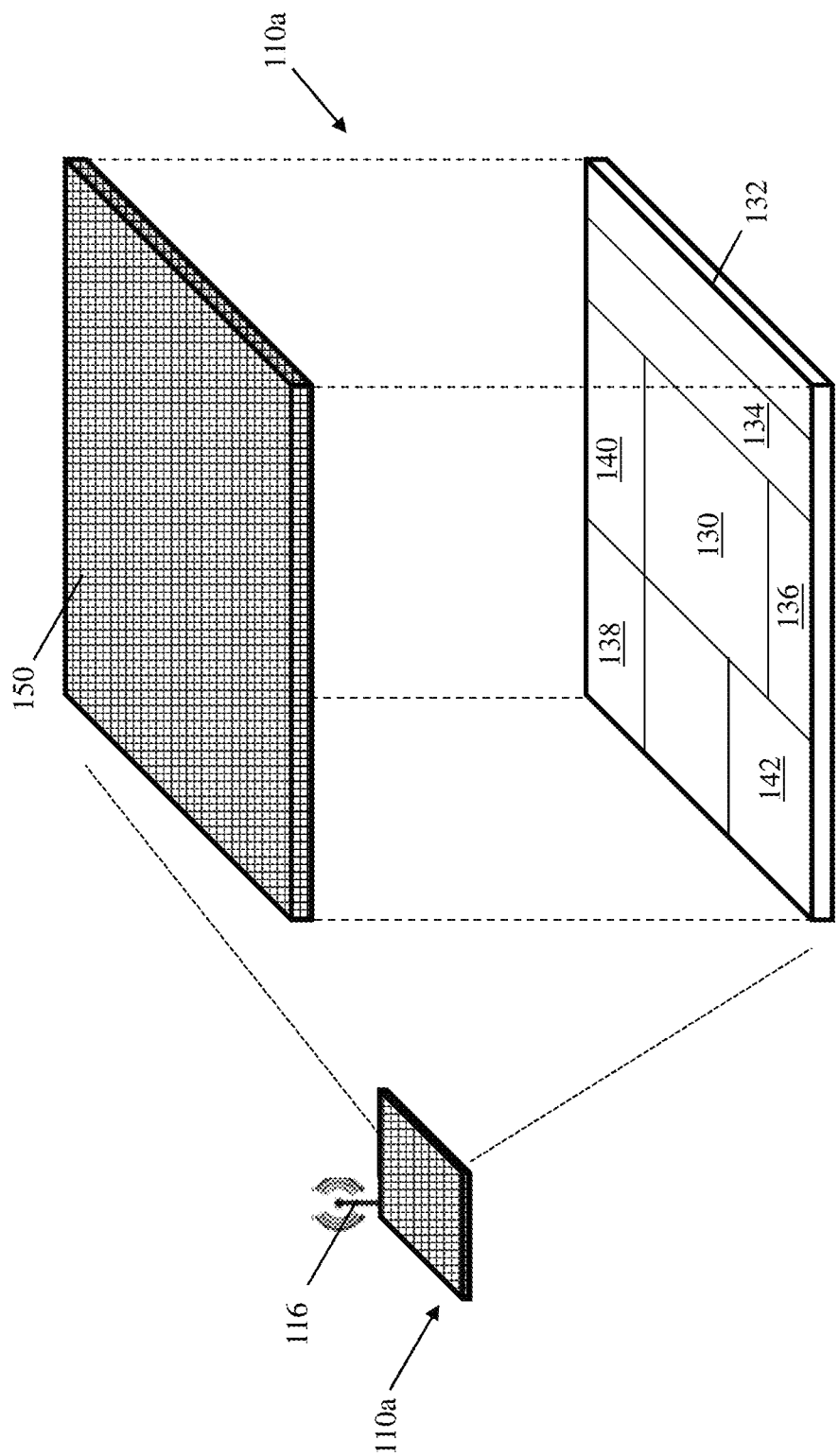
FIG. 2 shows a perspective assembly view of a transceiver assembly configured for a distributed communications network according to embodiments of the disclosure.

Turning to FIG. 2, an assembly view of static communication device 110a is shown to demonstrate example subcomponents thereof. The various subcomponents shown in FIG. 2 and described herein are provided as examples only, and the features and specifications of those subsystems are not intended to limit the possible use of other current or future subsystem designs.

In one example embodiment of static communication device 110a, a circuit board 130 may include one or more integrated circuits (IC) for electrically interconnecting various sub-components for providing operational features of static communication device 110a. In one example, circuit board 130 may be a small, lightweight programmable computer, such as a Raspberry Pi™, with wireless communication capabilities, such as Wi-Fi. In this circumstance, computer hardware of circuit board 130 may provide a wireless access point and may host a web server. Circuit board 130 may include one or more batteries 132 for storing and/or driving electrical energy for operating static transceiver 110a. Battery 132 may be connected to circuit board 130 through an electronic converter 134, e.g., for controlling and converting the electrical energy of battery 132 into a digital current capable of being processed through circuit board 130. A LAN card 136 coupled to circuit board 130 of communication device 110 may provide a local area connection to devices within the communications range of LAN card 136. A wide area network (WAN) card 138 coupled to circuit board 130, may enable long-range communication through long-range transceiver 116. WAN card 138 may be operable to communicate via long-range networking infrastructure, e.g., over a range of several miles depending on the amount of buildings, signal interference, etc. WAN card 138 may also enable several communication routes through other communication devices 110 included in one DCN 100. A global positioning system (GPS) transceiver 140 may also be coupled to circuit board 140. GPS transceiver may be configured to acquire, encode, decode, etc., positional data of static communication device 110a to perform geographical routing functions as described herein. Optionally, a power management microcontroller 142 (e.g., an Arduino microcontroller) may be coupled to circuit board 130. Microcontroller 142 may be included to allow local or remote users to selectively activate a "sleep" mode of communication device 110. In sleep mode, communication device 110 may cease nearly all operations to conserve energy under desired circumstances, e.g., other communication devices 110 being available or the absence of any disasters. In some cases, a user may set a predetermined time limit or conditions in which communication device(s) 110 will operate in sleep mode before resuming normal operation. In any case, microcontroller 142 may regulate the operation of circuit board 130 to begin or end different power modes, thereby providing energy preservation and cooperation between multiple communication devices 110 in the same vicinity.

Static communication device 110a may include one or more power sources 150. In the example of FIG. 2, power source 150 is provided in the form of a solar panel, though any conceivable apparatus for generating electrical power may be included. In other types of communication devices (e.g., aerial transceiver(s) 110b and/or vehicle-based transceiver(s) 110c), power source 150 may be the power source of the vehicle or other mobile device. According to an example embodiment, one type of solar panel suitable for use as power source 150 may require one Watt-hour (Wh) to run at a 25% duty cycle. Choosing the solar panel specifications will depend on actual and forecasted weather conditions, including amount of daily sunlight and historical weather trends for that location. In a mostly sunny area, a three or four W solar panel could be suitable for continuous operation, while areas with less sunlight may require a higher-wattage (e.g., ten to fifteen w) solar panel. In some cases, the power source 150 may be coupled to microcontroller 142 and/or other power regulation devices. In a further example, power source 150 may include a 24-Wh lead acid battery and a high efficiency buck converter to the electrical load. The 24-Wh battery will last an entire day on a full charge. Additional power generation and/or energy storage solutions may be considered for other embodiments of power source 150.

Figure 4:
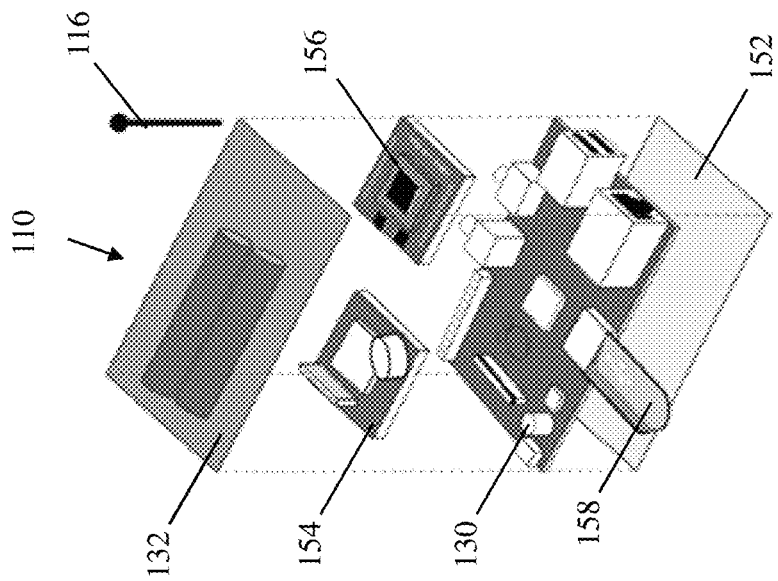
FIG. 4 shows a perspective assembly view of the battery-operated transceiver assembly according to further embodiments of the disclosure.
Figure 3:
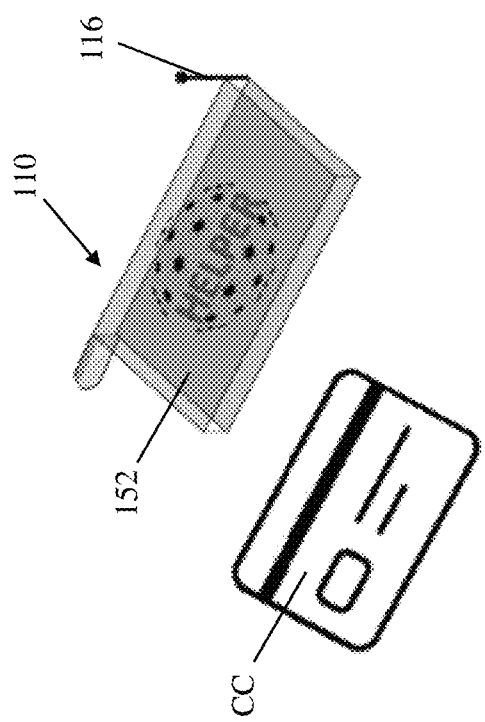
FIG. 3 shows a perspective view of a transceiver assembly according to further embodiments of the disclosure.

Turning to FIGS. 3 and 4, communication devices 110 may include a similar architecture in the case of an aerial transceiver 110b or vehicle-based transceiver 110c. In such cases, power source 150 may be eliminated and/or replaced with a battery or other power generation unit of the device where communication device 110 is used. FIG. 3 depicts an embodiment of communication device 110 according to further embodiments of the disclosure. In this case, communication device 110 may have a perimeter similar to that of a credit card (reference CC in FIG. 3 for comparison), but with greater thickness. Communication device(s) 110, as shown in FIG. 3, may include a portable housing 152. Portable housing 152 may be sized to contain circuit board 130 and battery 132 similar to other embodiments, but it is understood that battery 132 may be removed and/or replaced with power conversion components in the case where a vehicle battery provides power to communication device(s) 110. Battery 132 according to one example may include, e.g., a lithium ion battery configured to output a five volt (5V) electrical potential, e.g., with the aid of a boost converter (not shown) as known in the art. Lithium-ion batteries may be preferable because such batteries provide a substantially greater energy density compared to other batteries, e.g., lead acid batteries. Battery 132 may be a modular component capable of being interchanged with other batteries of similar size. This may allow some batteries to be charged at one location, e.g., a base camp, while others are being discharged through deployment in the communication device(s) 110.

The communication device 110 shown in FIGS. 3 and 4 may be configured for a user to carry into a disaster area or other field of operation. In this case, communication device 110 may include a power regulator 154 configured to shift the operation of communication device 110 between active and inactive (e.g., "sleep") operating modes. A processor 156 can execute algorithms and/or logical functions of software provided on communication device 110. Communication device 110 may also include, e.g., one or more memory components as discussed elsewhere herein. A bus 158 may provide an electrical pathway between the components of communication device 110 and other hardware, e.g., charging stations, computers, and/or other devices configured to be electrically coupled to communication device 110.

Figure 5:
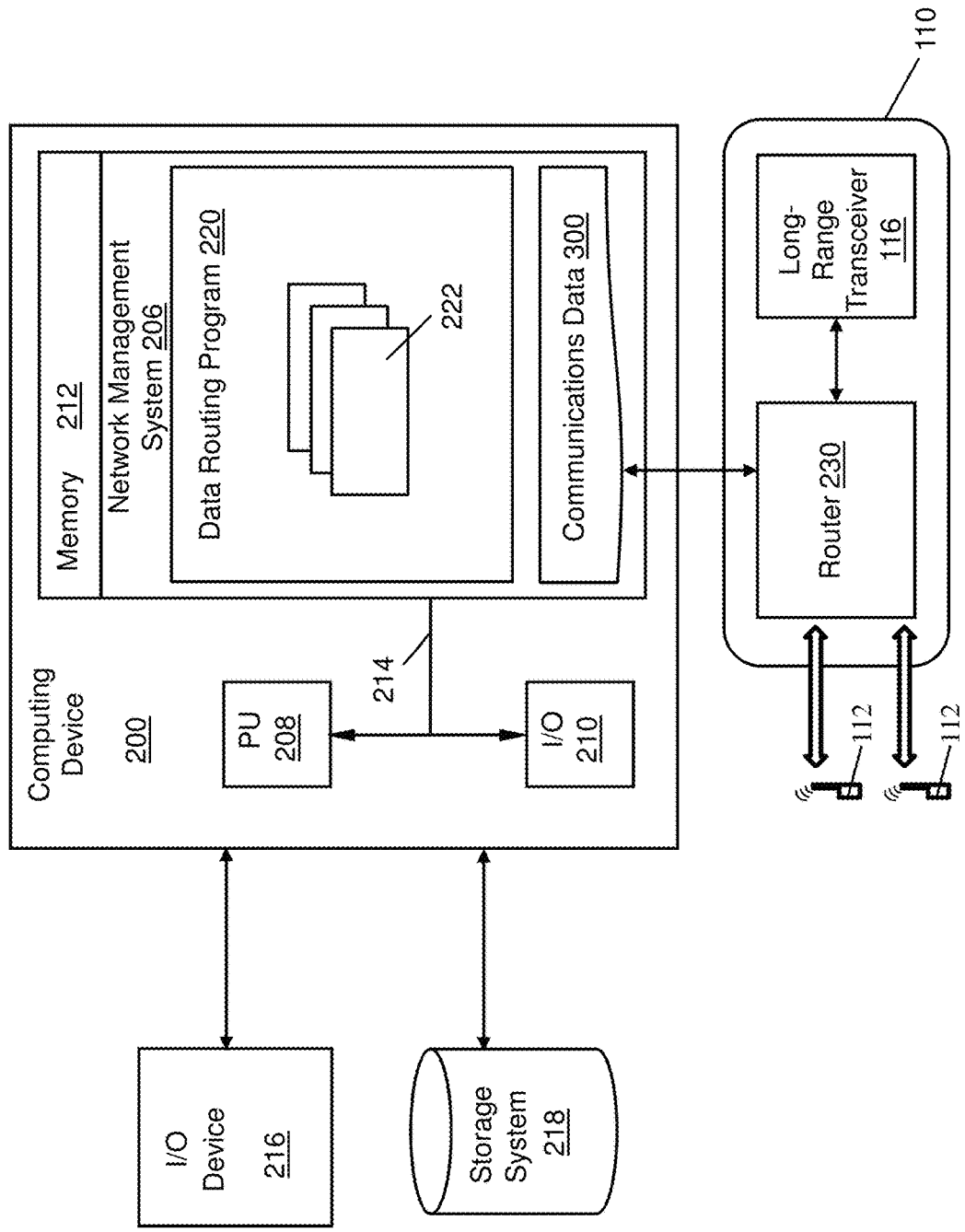
FIG. 5 shows a schematic view of an illustrative environment for routing data through a distributed communications network according to embodiments of the disclosure.

Turning to FIG. 5, embodiments of the disclosure may be implemented through the use of a computing device 200. Computing device 200 may be integrated into communication device(s) 110 and/or other components described herein, or may be an independent component connected to one or more devices within DCN 100. According to a more specific example, computing device 200 may be connected to or otherwise part of circuit board 130 shown in FIGS. 3, 4. Computing device 200 is shown connected to communication device 110 in the example embodiment shown in FIG. 5. Computing device 200 may include a processor unit (PU) 208, an input/output (I/O) interface 210, a memory 212, and a bus 214. Further, computing device 200 is shown in communication with an external I/O device 216 and a storage system 218. External I/O device 216 may be embodied as any component for allowing user interaction with communication device 110. Network management system (NMS) 206 can execute a data routing program (DRP) 220, which in turn can include various modules 222, e.g., one or more software components configured to perform different actions, including without limitation: a calculator, a determinator, a comparator, etc. Modules 222 can implement any currently known or later developed analysis technique for routing data through DCN 100 (FIG. 1). As shown, computing device 200 may be in communication with one or more communication devices 110 for sending and/or receiving various forms of data as part of DCN 100. Thus, computing device 200 in some cases may operate as part of a transceiver assembly, while in other cases the same computing device 200 may be an intermediate component (i.e., communication device 110) between two or more transceivers.

Modules 222 of DRP 220 can use calculations, look up tables, and similar tools stored in memory 212 for processing, analyzing, and operating on data to perform their respective functions. In general, PU 208 can execute computer program code, such as NMS 206, which can be stored in memory 212 and/or storage system 218. While executing computer program code, PU 208 can read and/or write data to or from memory 212, storage system 218, and/or I/O interface 210. Bus 214 can provide a communications link between each of the components in computing device 200. I/O device 216 can comprise any device that enables a user to interact with computing device 200 or any device that enables computing device 200 to communicate with the equipment described herein and/or other computing devices. I/O device 216 (including but not limited to keyboards, displays, pointing devices, etc.) can be coupled to communication device 110 either directly or through intervening I/O controllers (not shown).

Memory 212 can include a cache of communications data 300 transmitted across DCN 100. As discussed elsewhere herein, computing device 200 can send, receive, and/or rely various types of communications data 300. Communications data 300 can also include one or more fields for classifying and/or prioritizing the various types of communications to be transmitted across DCN 100. Communications data 300 may be provided to and/or from communication device 110, e.g., for transmission via DCN 100. To exchange data between multiple transceivers and/or communication devices, computer system 200 may be connected to long-range transceiver 116 and/or a short-range transceiver 230 for establishing a LAN for communication with LAN devices 112 as noted elsewhere herein. Short-range transceiver may include any currently known or later developed device for establishing a short-range communications network between devices in a local area, including but not limited to wired connections, wireless networks such as Wireless Fidelity ("Wi-Fi") networks, and/or other networking solutions.

Communications data 300 can optionally be organized into a group of fields. In some cases, communications data 300 may include various fields indicative of how reliably communications data 300 may pass through one or more communication devices 110 in DCN 100. For example, communications data 300 may include data for recording and/or estimating a distance between various communication devices 110, a transmission queue of computer system 200 and/or other communication devices 110, a remaining life of power source 150 (FIG. 3) based on a current energy level, a power consumption needed to transmit a particular data packet to communication device 110, a data throughput of communication device (i.e., the amount of time needed for one communication device 110 to provide the data packet to another communication device 110) etc.

Embodiments of the disclosure include processes to calculate a utility score indicative of how easily communication device(s) 110 may transmit signals to other communication device(s) 110, and/or network gateway(s) in the same DCN 100 via long-range transceiver 116. The utility score calculated for each candidate communication device 110 may be stored in memory 212 of computing device 200 in one or more fields of communications data 300. The calculated utility score(s) may differ from other conventional metrics of communication reliability by being defined as a "cross-layer" metric. That is, utility score(s) in communications data 300 may include variables indicative of multiple layers within communication device (s) 110, including a hardware layer, software layer, network layer, etc. According to one example, the calculated utility score may include a dimensionless variable calculated from physical level parameters (e.g., energy level of power source 150 as noted above and/or similar parameters), network level parameters (e.g., a transmission queue in one or more communication device(s) 110), and/or a link layer parameter (e.g., a data throughput of one or more communication device(s) 110. In various alternative embodiments, utility score(s) in communications data 300 may include any cross-layer parameter, i.e., any conceivable parameter calculated based on two or more layers of communication device(s) lin DCN 100.

In an example implementation, each transceiver may assign a higher utility score to other transceivers 110 that are located nearby, have few previous data packets in their queue, have greater amounts of power and/or battery life, and/or may deplete a relatively smaller amount of residual energy life. As noted elsewhere herein, DRP 220 may be capable of expressing such quantities as a utility score for a subset of communication devices in communication with a particular transceiver. Communications data 300 can also include calculated or predetermined referenced values for each field. For instance, communications data 300 can include a set of baseline and/or training data used in comparison to evaluate the communications reliability of some communication devices 110, and such data can be included with communications data 300 or otherwise stored in memory 212. Communications data 300 can also include threshold and/or tolerance values for comparing baseline values with values measured for a specific communication device 110 to evaluate its reliability with respect to the communication device 110 where computer system 200 is deployed. Each form of communications data 300 can, in addition, be indexed relative to time such that a user can cross-reference various forms of communications data 300. It is also understood that communications data 300 can include other data fields and/or other types of data therein for routing communications data 300 through DCN 100 as described herein.

Communications data 300 can also be subject to preliminary processing by modules 222 of DRP 220 before being recorded in memory 212. For example, one or more modules 222 can apply a set of rules to interpret the characteristics of other communication devices 110 to further evaluate and/or monitor the reliability of various routes through DCN 100. Such rules and/or other criteria may be generated from predetermined data and/or relationships between various quantities. For example, an operator may determine that remaining charge of one communication device 110 may inhibit transmission through a particular channel, while particularly high throughput of one or more communication devices 110 may indicate lower traffic and hence greater reliability by selecting a particular communication device 110 for transmission in DCN 100.

Computing device 200 can comprise any general purpose computing article of manufacture for executing computer program code installed by a user (e.g., a personal computer, server, handheld device, etc.). However, it is understood that computing device 200 is only representative of various possible equivalent computing devices that may perform the various process steps of the disclosure. To this extent, in other embodiments, computing device 200 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 200 may include a program product stored on a computer readable storage device, which can be operative to automatically route data through various communication devices 110 of DCN 100.

Communications data 300 may also include information regarding the location of communication device 110, or other communication devices within the communications range of communication device 110. In this case, DRP 220 may be capable of using locational data on three different axes (e.g., X-axis, Y-axis, and Z-axis) in three-dimensional space to modify and/or tag certain types of communications data 300 in three-dimensional space. Such data can be further processed by models incorporating one or more of, e.g., positional data of other communication devices 110 to for plotting, tabulation, and/or other mathematical expression in a modified coordinate system (i.e., a three-dimensional space) for modeling the location of each communication device 110 and reliability of communicating between communication devices 110 of DCN 100. The data expressed in such a modified coordinate system can then be transmitted from communication device 110 (e.g., with long-range transceiver 116) and processed by a remote database or data processing system (e.g., network gateway 120). As described elsewhere herein, positional information can be modeled as distinct components along a reference axis in a three-dimensional space, and paired with specific serial numbers, time stamps, measurement time intervals, etc., for efficient organization in memory and/or in a remote database. Where multiple fields of communications data 300 pertain to multiple types of data, each field can include an identifying value, data priority, etc., for indicating whether the measurement represents a location, data reliability metric, utility score, etc.

Figure 6:
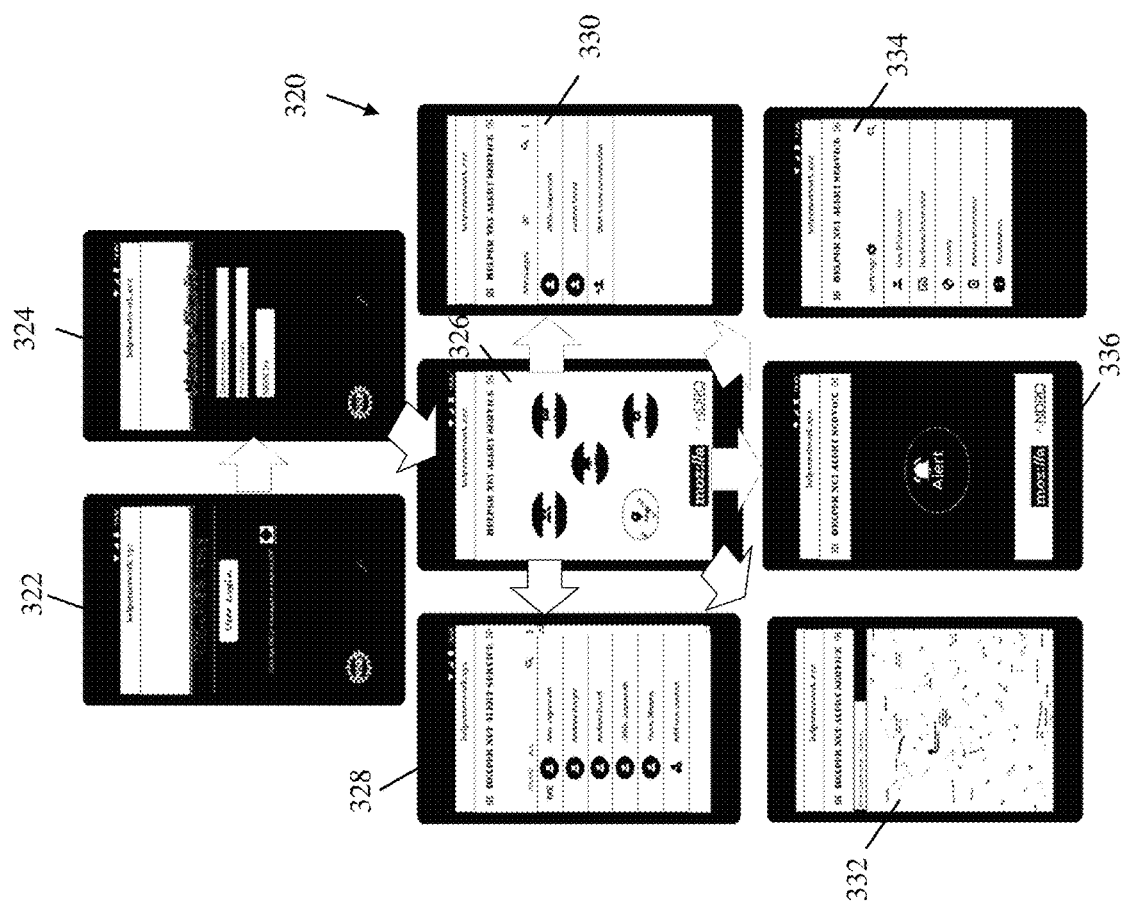
FIG. 6 shows a schematic view of an application interface for a transceiver assembly according to embodiments of the disclosure.

Referring to FIGS. 5 and 6, embodiments of the disclosure provide an application interface 320 by which human users may access DCN 100 and perform various functions with the aid of computer system 100. Application interface 320 may be accessible and/or provided to a user via I/O device 216, which may in turn be included within computer system 200 and/or LAN device(s) 112. Application interface 320 may provide a user interface (UI) to perform certain basic functions in the wake of a disaster where conventional networks are not available. DCN 100, as discussed herein, may provide a standalone framework of communication devices 110 that guarantees the user stays connected and can communicate with responders and/or with other users at time of emergencies. The user will be able to connect to DCN 100 in a manner similar to how they would connect to an open Wi-Fi network. Application interface 320 is shown as a mobile application in FIG. 6, but it is understood that application interface 320 may additionally or alternatively be provided via another type of application (e.g., browser-accessible webpage, a program installed on a personal computer or other device, etc.) for viewing and interaction through any network-enabled device.

Application interface 320 may serve a variety of functions. For example, application interface 320 may provide a login screen 322. People in a disaster-affected location may access the features of application interface 320 through login screen 322. Login screen 322 may also provide a link to download a Mobile App which also contains an embodiment of application interface 320. Application interface 320 may also provide a sign-in screen 324. A registered user can login with the username and password with which he/she was registered using sign-in screen 324. Upon successful authentication of the user's credentials, the user will proceed to a menu screen 326. Menu screen 326 in one embodiment features five virtual buttons, each corresponding to particular actions and/or screens. A contacts screen will provide a catalogue of human or machine users capable of being contacted through DCN 100. Contacts screen 328 may be subdivided based on user availability, e.g., whether a user is registered or currently online. Contacts screen 328 may also provide modification and accessibility features, e.g., a "search bar," "add," "modify," and/or "delete" option to let the user search for, add, modify, or delete any listed contacts. Once signed in, the user can return to menu screen 326 at any time by tapping the menu button. Application interface 320 may also include a messages screen 330 which provides access to all conversations the user has had with his/her contacts. Additionally, messages screen 330 has options to clear all conversations, Search, delete and start a conversation via application interface 320. A map screen 332 gives the user directions to a chosen destination. The destination address can be entered in the "Enter Destination Address" text field. Additionally, the map screen 332 may be updated with local resource availability, hospitals, etc. Map screen 332 may be updated with location markers showing nearby gas stations with fuel, grocery stores and/or pharmacies that are still open etc., when in communication with DCN 100. A settings screen 334 may display hardware, release information, security and/or troubleshooting options to a user. Setting screen 334 may also include search and accessibility features. An alert screen 336 allows a user to review various alerts including current alerts, past alerts, pending alerts, etc. Alert screen 336 also allows a user to send or otherwise initiate an emergency alert to DCN 100, e.g., notifying other people that the user is in need of emergency services. Emergency alerts initiated via alert screen 336 may be given priority status, and thus may affect the selected transceivers for relaying the alert through DCN 100.

Application interface 320 may offer additional features. For example, application interface 320 may provide an internal queue for outbound messages. This will help the mobile users who momentarily go out of range of a radio unit. Once reconnected, the messages would be sent out automatically. Application interface 320 will also have relay capabilities with the internal queue. If there is a cluster of radio units that became isolated from DCN 100, the messages would queue (duplicated) on all the users in the isolated portion of DCN 100. Then, even if only one of these mobile users physically migrated and reconnected to DCN 100, application interface will upload alert messages of the other users to DCN 100 even while they are still isolated. The location information in these messages could be used by network gateway 120 (FIG. 1) to map the location of each transceiver 110 and identify weak areas in DCN 100. Similarly, application interface 320 in some cases may be capable of relaying incoming data back to isolated transceivers 110 have to carry these messages by physically going back to the isolated part of DCN 100 until new radio units are deployed to connect the isolated part to the rest of DCN 100. Application interface 320 may also be used by responders in field to stay in contact with network gateway 120 and to receive critical alert messages from nearby users. For responders, the mobile app will operate in a "First Responder" mode, which may provide administrative and/or priority features.

Returning to FIG. 1, further details of communication across DCN 100 via communication devices 110 are described. Communication across DCN 100, within LAN area 114, and various features of application interface 320 may be enabled using the combination of LAN and WAN technologies, e.g., Wi-Fi and LoRa. Each networking technology may be known as a "physical layer." Using two widely-used physical layers enables Wi-Fi compatibility with ubiquitous mobile devices to ensure seamless access for users within LAN area 114, and LoRa for longer range network communication. Using a well-known or off-the shelf technology in each physical layer may help to reduce costs and preserve accessibility to many users. An example configuration of physical layers may include:

| Features | LAN (Wi-Fi) | WAN (LoRa) |
| --- | --- | --- |
| Frequency Range | 2.4 GHz | 868 MHz-918 MHz |
| Bandwidth | 20 MHz-40 MHz | 7.8 kHz-500 kHz |
| Transmission Range | Medium | High |
| PHY techniques | DSSS, OFDM, MIMO-OFDM | DSSS, FSK |

Each communication device 100 may include features of managing medium access to the network, e.g., via NMS 206. According to the example above, one level of access is required for each of the two physical layers (LAN and WAN). Specifically, access to LAN may govern communications between communication device(s) 110 and LAN devices 112 such as phones, laptops and/or tablets. Access to WAN governs communication between different communication device(s) 110 and with network gateway 120. In this case, standard medium access control (MAC) protocol may be employed (e.g., by Wi-Fi) to allow multiple users access to transceivers 110 within LAN area 114. MAC protocol may be implemented with carrier sense multiple access with collision avoidance (CSMA/CA) based medium access control (MAC) protocol to provide an ad hoc DCN 100 using the WAN physical layer. Channel Activity Detection (CAD) is offered as a hardware feature on some WAN subsystems, e.g., LoRa. CAD may be a valuable tool where the WAN physical layer uses spread spectrum transmissions. The spread spectrum is known to operate at a low signal to noise ratio, making traditional approaches like power detection with received signal strength indication (RSSI) unreliable. CAD helps to detect whether there is ongoing transmission in the channel chosen within two symbols. This feature may assist in implementing a MAC protocol in conjunction with the WAN layer of DCN 100.

DCN 100 may have a variety of configurations, depending on the availability or non-availability of infrastructure during a disaster. FIG. 1 depicts DCN 100 in a scenario where full accessibility and resources are available to users. In this scenario, accessibility is not restricted and the responders have all the required resources (including each type of transceiver 110a, 110b, 110c) to create DCN 100 with robust coverage. In this scenario, each communication device 110 can be located strategically to ensure full coverage of the affected area. Stationary transceivers 110a in particular may be under direct sunlight to enable constant operation. The deployment of stationary transceivers 110a moreover may be relatively sparse as all types of communication devices 110 can be arranged optimally to ensure full coverage and extended lifetime. Aerial and vehicle transceivers 110b, 110c may continue to supplement DCN 100 in this scenario. Aerial transceivers 110b may use periodically-broadcast survey packets, as described below, while flying over the affected areas to determine the transceivers 110 that might need replacement due to depletion of battery or absence of sunlight. Overall, there is more control on deployment of transceivers 110 and hence easier to provide full coverage and repair disconnected parts of DCN 100.

Figure 7:
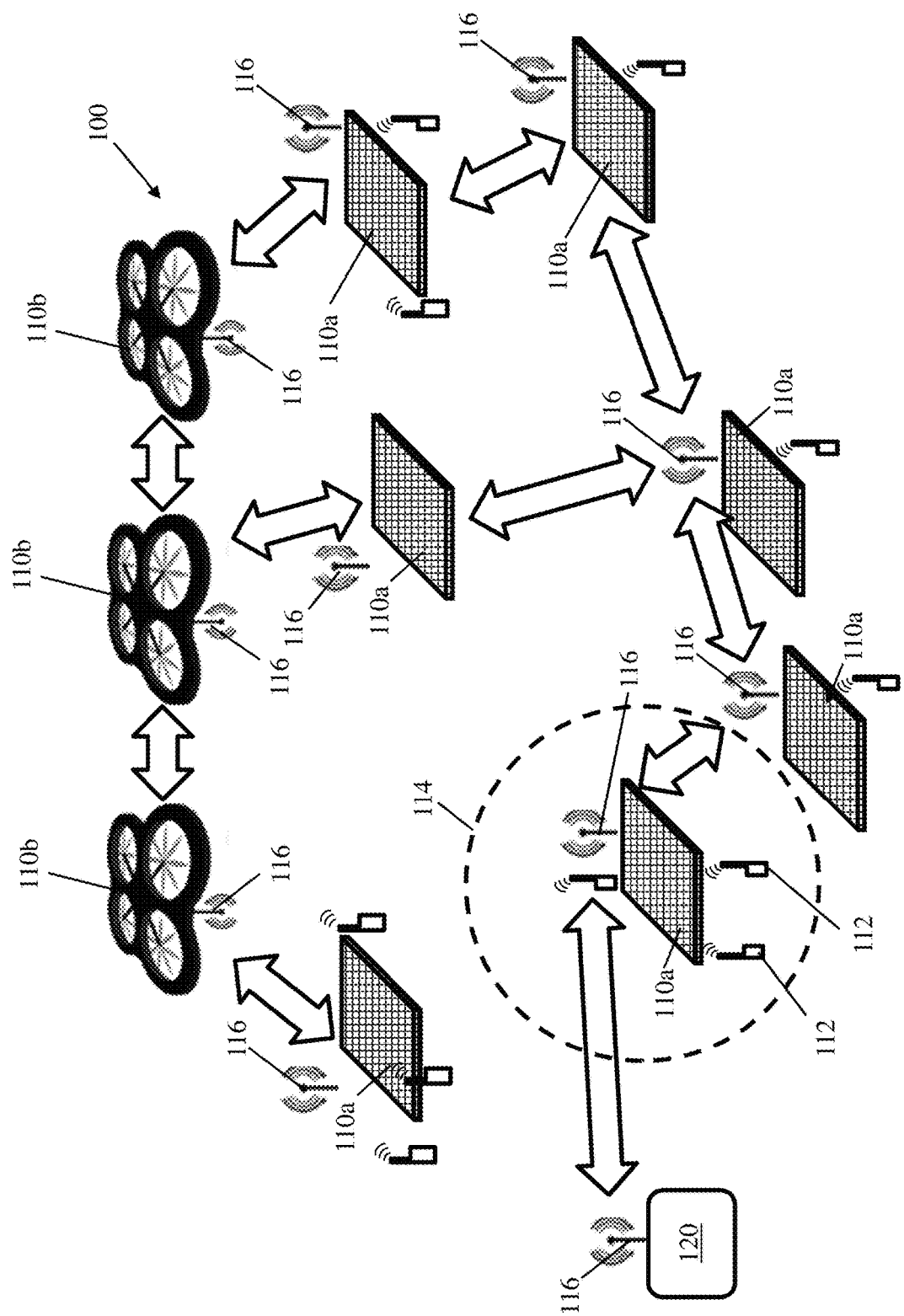
FIG. 7 shows a schematic view of a distributed communications network according to further embodiments of the disclosure.

Referring to FIG. 7, further embodiments of DCN 100 may be capable of operating under more limited accessibility constraints, e.g., at the onset of a disaster. In this case, there may be few vehicle transceivers 110b for traveling between disparate areas in DCN 100. To address this limitation, aerial transceivers 110b may be deployed to provide additional connectivity and network lifetime. Aerial transceivers 110b in some cases may be present in the emergency kits of households, or other buildings before the onset of a disaster. Additionally, large numbers of aerial transceivers 110b may be deployed via air. Aerial transceivers 110b may be further configured to identify network holes, i.e., areas without coverage or isolated transceivers 110. When isolated transceivers 110 are identified, aerial transceivers 110b will act as a temporary sink transceiver and will contact, or return to, network gateway 120 with this information. This will enable responders to have access to survivor information in isolated areas and prepare rescue efforts. The aerial transceivers 110b will also be able to sew the detected network holes by deploying radio units to provide complete network connectivity.

Figure 8:
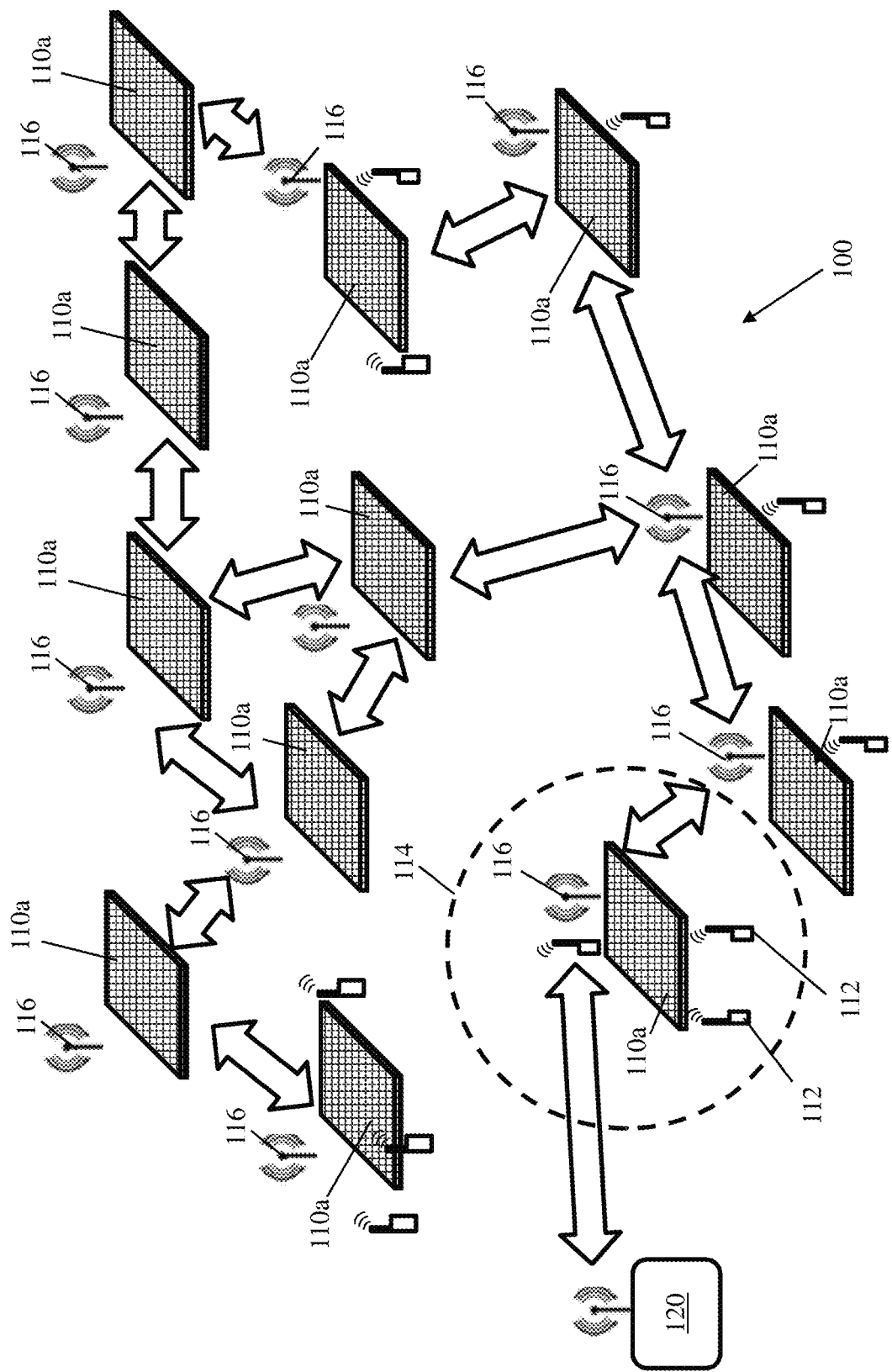
FIG. 8 shows a schematic view of a distributed communications network without mobile transceiver assemblies according to further embodiments of the disclosure.

FIG. 8 depicts a third scenario, in which communication across DCN is limited only to stationary transceivers 110a without the aid of any aerial transceivers 110b or vehicle transceivers 110c. In the third scenario, there is a clear lack of access and resources. To account for such high-risk areas or scenarios, multiple stationary transceivers 110a may be deployed in a dense region to cover the region for connectivity. The dense network will operate in an ad hoc manner bolstered by the routing algorithms, discussed below, to maximize the coverage and lifetime of DCN 100 to the extent possible.

Aspects of the disclosure are concerned with guaranteeing energy-efficient communication over the DCN 100, particularly to preserve the useful life of each transceiver 110 when traditional power generation infrastructure is unavailable. Most energy consumption in the DCN 100 arises from transmitting data packets from one transceivers 110 to another, and/or exchanging data with network gateway 120. Thus, the routing of data in the DCN 100 is critical to the effectiveness of DCN 100. Embodiments of the disclosure provide a data routing algorithm for efficiently transmitting data packets over the DCN 100. The data routing algorithm, as discussed below, takes into account various factors such as transceiver throughput and/or energy efficiency of routing along specific formulas to define an optimization problem, with the objective of maximizing network lifetime while maintaining reliable connectivity. Due to the ad hoc nature of DCN 100, the algorithm is provided at network gateway 120 and distributed over transceivers 110 by independent transmission and/or by "hopping" through intermediate transceivers 110. Once distributed, the algorithm may execute independently at each transceiver 110 for independent determining of where to send each data packet at a particular time.

Figure 9:
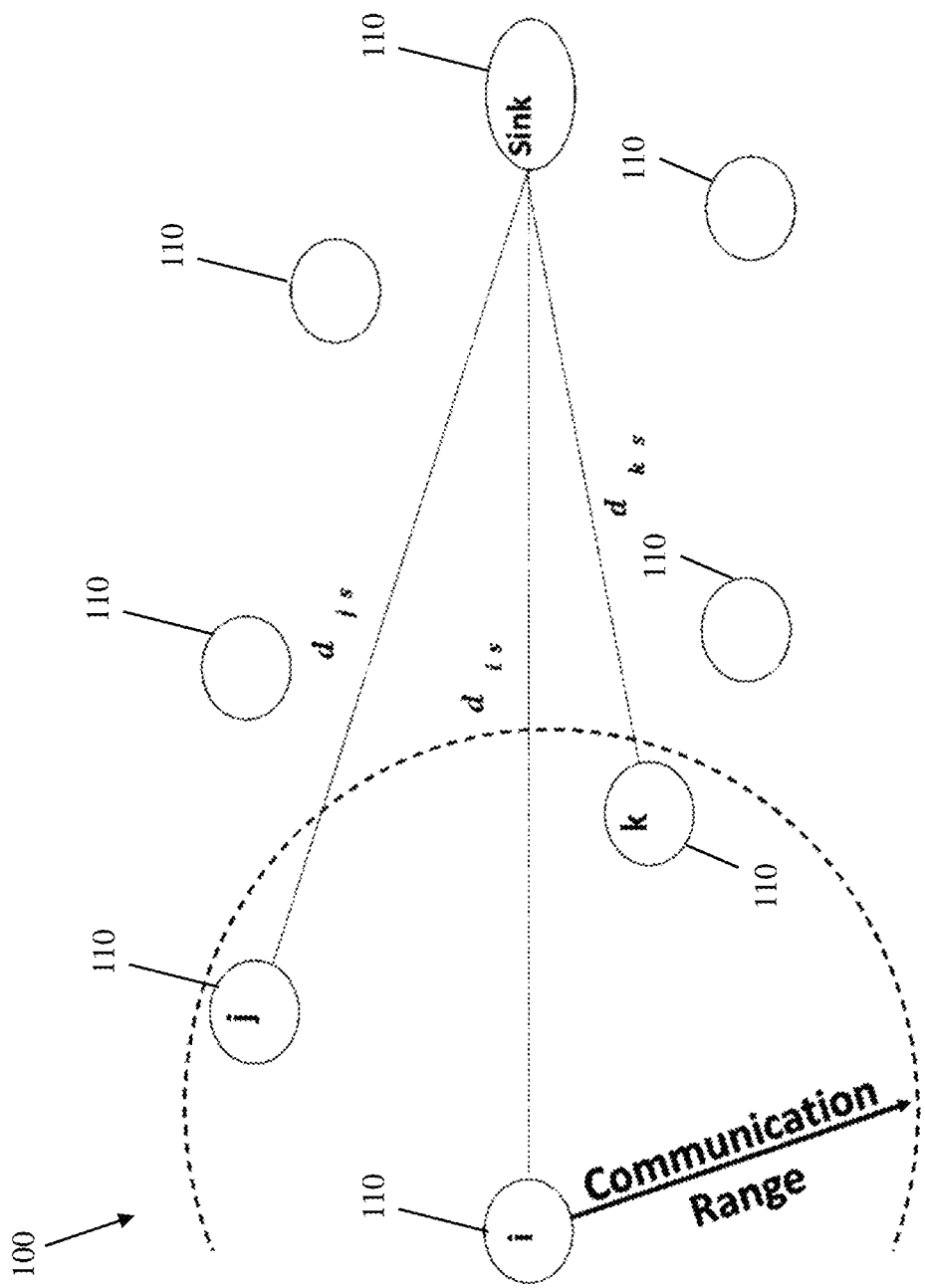
FIG. 9 shows a schematic view of devices and transceiver assemblies in a distributed communications network according to further embodiments of the disclosure.

FIG. 9 provides a schematic view of multiple transceivers 110 in the DCN 100. Referring to FIGS. 5 and 9 together, DRP 220 of computing device 200 may implement functions for routing communications data 300 from one transceiver 110 to another transceiver 110. Modules 222 of DRP 220 thus may execute the various calculations and related steps to model transmission pathways from one transceiver 110 to various candidate transceivers 110. One transceiver ("i") may be instructed to send a data packet to another transceiver in DCN 100. A subset of transceivers 110 within the communication range of "i" are denoted "j" and "k." In some cases, the transceiver denoted ("i") or the subset of transceivers 110 which may receive data packets may be replaced with one or more network gateways 120. Transceivers 110 are discussed below solely for the sake of example.

To account for a large number of situations, the routing algorithm may operate under the assumption of a most-limited networking scenario (i.e., FIG. 8 discussed above) with limited access and networking resources. Here, DCN 100 may be modeled as a dense multihop wireless network featuring multiple stationary nodes 110a. DCN 100 may be modeled as a directed connectivity graph where connectivity ("G") is a function of the number of transceivers 110 ("N") and wireless communications pathways ("E") between each transceiver 110. Where $N=\{H_1, H_2 \ldots, H_N\}$ is a finite set of wireless transceivers 110, and $L(i,j) \in E$ represents each unidirectional wireless link from transceiver $H_i$ to transceiver $H_j$ (for simplicity, first and second transceivers 110 are designated as transceiver i and transceiver j). G is assumed to be link symmetric, i.e., if $L(i,j) \in E$, then $L(j,i) \in E$. Each transceiver 110 is assumed to have a respective transmission range R based on the chosen transmit power $P_t$. All transceivers 110 are equipped with positional sensors (e.g., GPS), as noted above, and therefore the location (longitude/latitude) coordinates are known. The positional data of each transceiver 110 will allow reliability calculations to reflect physical distances between one transceiver 110 and a candidate transceiver for transmitting data packets across DCN 100. As shown in FIG. 9, transceivers 110 denoted "j" and "k" within the transmission radius of "i" will constitute candidate communication devices which may receive data packets from "i." The set of candidate transceivers 110 is thus denoted as $N_i=\{j, k\}$. One transceiver 110 or network gateway 120 operating as a "Sink," i.e., a component capable of moving to a remote location for further transmission, is denoted "Sink" in FIG. 9 and "S" in the algorithm. The location of S may be predefined in every transceiver 110, or this information is provided at the time of a network configuration. In this example, the transmitted packets are desired to be transmitted to sink S, but the same formulation may be applied to any source-destination pair of transceivers 110.

The distance between two transceivers i,j is represented by $d_{ij}$. If transceiver j is within the transmission range ("R") of transceiver i, there exists a link $L(i,j)$, i.e., a wireless communication link $L(i,j)$ exists when $d_{ij} \leq R$. The power consumed over $L(i,j)$ or the power required by the source transceiver (i) to transmit to a neighboring transceiver (j) is denoted by $P_{ij}$. The original battery life of one transceiver may be its "initial" battery life, while the currently remaining battery life may be its "residual" battery life. The initial and residual battery energy at transceiver i may be expressed as $E^i_0$ and $E^i_r$, respectively. Every transceiver 110 may maintain a queue of outbound data packets. In this case, $q_i$ may represent the instantaneous number of packets retained in the queue of transceiver i, also called the queue backlog. The transmission bit rate and bit error rate over $L(i,j)$ are denoted by $R^{ij}_b$ and $e^{ij}_b$ respectively.

Embodiments of the disclosure may use positional data for each transceiver 110, in addition to the differential queue backlog at each transceiver 110, residual battery energy of transceiver(s) 110, and transmission energy levels to compute the optimal next "hop" toward transceiver 110 functioning as a "sink." The utility function considers the following parameters associated with each candidate transceiver 110: (i) proximity to sink, (ii) differential queue backlog, (iii) residual battery energy, (iv) power required to transmit over the link and (v) the corresponding link throughput, i.e., the likelihood that each candidate transceiver 110 will then transmit the data packet to another transceiver 110 and/or the intended sink.

The raw data to be processed via the data routing algorithm may be gathered from traditional control packets like RTS (request-to-sent), CTS (clear-to-sent) and periodically-broadcast survey packets. Such packets may indicate the most-recent attributes of each transceiver 110, e.g., residual battery energy, queue backlog, distance to sink transceiver and a "probe" field. In many instances, the real-time signal-to-noise ratio (SNR) is unknown to each transceiver 110. Therefore, measures derived from SNR estimated based on a radio propagation model are not a suitable basis for signifying transmission reliability over a link $L(i,j)$, and not factored into the utility score. Instead, the "probe" field in each control packet may be used to perform link probing. That is, the "probe" field may include a bit sequence known by each transceiver 110 in network DCN 100. Upon receipt of a control packet, each transceiver 110 will compute its effective throughput (goodput) measure in bits per second (bps). The term 'Goodput' may signify the effective number of bits successfully received. For example, once transceiver i receives a control packet from transceiver j, it will compute the corresponding goodput measure $(G_{ij})$ with respect to $L(i,j)$. The energy efficiency of networks with limited energy can be expressed as a ratio between goodput and transmission power as:

$$\eta_{ij} = \frac{R^{ij}_b (1 - e^{ij}_b) G_{ij}}{P_{ij}}$$

The variable $\eta_{ij}$ denotes the measure of number of bits successfully transmitted over $L(i,j)$ per Joule of transmission energy. Another factor to be considered when routing data packets is the differential queue backlog $(\Delta Q_{ij} = q_i - q_j)$ with respect to the source transceiver (i) and next-hop (j). The queue backlog at the destination transceiver is assumed to be 0. Considering the queue backlog is necessary to prevent queuing delays in the network, and traditional backpressure algorithms has been shown to be throughput optimal. Since achieving maximum throughput is not the sole objective of DCN 100 operation, differential backlog is only parameter in the utility function. The "effective progress" made by a packet can be represented as $d_{iS} - d_{jS}$. Choosing candidate transceivers 110 that provide larger progress implies fewer hops to the sink transceiver 110 which in turn could reduce energy consumption. To provide a more uniform depletion of energy per transceiver 110, the routing algorithm may consider the $E_r^j$ of potential next hops. Therefore, formula for a utility score may be expressed as:

$$u_{ij} = \eta_{ij}\left(\frac{\max[\Delta Q_{ij}, 0]}{q_i}\right)\left(\frac{d_{iS} - d_{jS}}{d_{iS}}\right)\left(\frac{E_r^i}{E_0^j}\right), \forall j \in \mathbb{N}_i$$

$\eta_{ij}$ aims to improve the energy efficiency of the network. The maximum value of $U_{ij} = \eta_{ij}$ when each of the three normalized terms are 1. This implies that each of the other terms penalizes the utility function based on the instantaneous value. For example, a small differential backlog ($q_i - q_j < q_i$) will dampen the value of $U_{ij}$. Both $d_{iS} - d_{jS}$ and $E_r^j$ will have similar effects on $U_{ij}$.

The objective of the routing algorithm is to maximize the summation of $U_{ij}$ for all possible links L(i,j) in order to maximize the overall energy efficiency of data transmission across DCN 100. This in turn will provide reliable communication while maximizing the network lifetime (which is defined as the time when first transceiver in the network depletes its energy leading to a network hole). The optimization problem is subject to residual battery energy, queue backlog, bit error rate and capacity constraints. This is formulated as Problem $P_1$ shown below, $P_1$: Given: $G(N, E), G, E_r, Q$ Find: $NH^{opt}$ Maximize: $\sum_{i \in \mathbb{N}_{net}} \sum_{j \in \mathbb{N}_i} U_{ij}$ subject to:

$R_b^{ij} \leq C_{ij}, e_b^{ij} > e_{b*}^{ij}, \forall i \in \mathbb{N}_{net}, \forall j \in \mathbb{N}_i$ $E_r^i > 0, q_i \geq 0, \forall i \in \mathbb{N}_{net}$ This formulation seeks to find the set of next-hop for all transceivers 110 in DCN 100 which can be represented as $NH^{opt} = [NH^{opt}_i], \forall i \in \mathbb{N}_{net}$. In the above optimization problem, $\mathcal{P}_1$, $\mathbb{G} = [G_{ij}]$, $\mathbb{E}_r = [E_r^i]$ and Q=[$q_i$], $\forall i \in \mathbb{N}_{net}, \forall j \in \mathbb{N}_i$ denote the set of goodput measure, residual battery energy and queue backlogs of all transceivers 110 in DCN 100. To derive a solution for a given deployment, transceivers 110 may require global knowledge of the network in terms of G(N,E), G, $E_r$, Q for all other transceivers 110, or at least a subset of transceivers 110 in DCN 100 where data packets may be transmitted. To enable such a solution, embodiments of the disclosure provide a routing algorithm distributed across each transceiver 110 to enable each transceiver to independently find the best transceiver 110 for a "next-hop" based on the local information available.

During operation, each transceiver 110 may implement a routing algorithm to route data packets through DCN 100 as described herein. At this point, each transceiver 110 (e.g., through computing device 200) will solve a local optimization problem to find the next-hop from it's a list of candidate transceivers 110 within its communication range. The probability of channel access, e.g., when multiple transceivers 110 offer similar reliability, will be controlled by utility-based random backoff. Accordingly, every source transceiver (i) will aim to maximize the utility function $U_{ij}$ and select the neighbor transceiver with greatest value for the utility function as its next-hop. The routing policy to select the optimal next-hop ($NH^{opt}_i$) at each source transceiver i with a set of neighboring transceivers Ni is expressed as: $NH^{opt}_i$=arg max $U_{ij}, \forall j \in Nij$.

Each transceiver 110 may maintain and continuously update a neighbor table (e.g., as communications data 300) with various parameters of its neighbors. Transceivers 110 over time may update the table as needed based on information from the various data packets. According to one example, the source transceiver denoted "i" maintains neighbor data via the following format:

| Transceiver ID | Distance to Destination | Queue Backlog | Residual Battery Energy | Goodput |
|---|---|---|---|---|
| j | $d_S^j$ | $q_j$ | $E_r^j$ | $G_{ij}$ |
| k | $d_S^k$ | $q_k$ | $E_r^k$ | $G_{ik}$ |

The transceiver(s) 110 or network gateway(s) 120 operating as a sink may collect and disseminate high-level information like availability of resources, drop-off locations, emergency updates for survivors among others. This information may be periodically supplied to all transceivers 110 in DCN to enable all locations obtain the updated information. The periodicity of updates may be selected to minimize the number of transmissions while ensuring all transceivers 110 receive the updated data when appropriate. Additionally, different packets may be processed with different priority based on the position of each transceiver 110 in DCN 100.

Upon calculating the utility score for each candidate transceiver 110, or network gateway 120 where applicable, the data routing algorithm may generate instructions to transmit one or more data packets to the transceiver(s) 110 or network gateway(s) 120 with the highest utility score. The transceiver(s) 110 receiving such security packets may then re-implement the algorithm for other transceiver(s) 110 or network gateways 120, or may provide the data packets to a user or other component of DCN 100. In any case, embodiments of the algorithm discussed herein may be provided throughout DCN 100, such that each transceiver 110 and/or network gateway 120 may independently generate instructions for where successive data packets will be transmitted.

Along with the routing algorithm, each transceiver 110 in DCN 100 may apply compression techniques to further reduce energy consumption. In conventional settings, compression of data before transmission does not grant large benefits due to the extra processing time required for compression and decompression. In embodiments of the disclosure, however, compression of data before transmission may provide large benefits due to the low data rate of long range WAN links and substantial processing power required on each computing device 200 for transceiver(s) 110. The compression algorithm used may be commercially available, e.g., one or more open source products such as .zip compression, which depending on the data can compress it to 20%-40% of its original size. If .zip or other open source compression algorithms are not available, other types of compression algorithms may be used to perform the same or similar data compression functions.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A communications apparatus for a distributed communications network (DCN) having a plurality of communication devices, the communications apparatus comprising:
    a transceiver assembly including:
        a short-range transceiver configured to generate a local area network (LAN) for exchanging communications data between the transceiver assembly and at least one LAN device;
        a long-range transceiver configured to connect the transceiver assembly to a subset of the plurality of communication devices;
        a power source coupled to the transceiver assembly; and
        a computing device connected with the transceiver assembly and configured to:
        calculate a utility score for the subset of the plurality of communication devices, wherein the utility score quantifies transmissibility of a data packet from the transceiver assembly to each communication device in the subset of the plurality of communication devices and is based on: a distance between the transceiver assembly and each communication device, a transmission queue at the transceiver assembly, a remaining life of the power source coupled to the transceiver assembly, power consumption to transmit the data packet to each communication device, and a data throughput of each communication device, and
        generate instructions to transmit the data packet to at least one communication device in the subset based on the calculated utility score.

2. The communications apparatus of claim 1, wherein the long-range transceiver comprises a radio frequency (RF) antenna configured to transmit the data packet via the DCN, and wherein the DCN comprises a low-power wide-area network (LPWAN).

3. The communications apparatus of claim 1, wherein the power source is a power generation apparatus independent of the plurality of communication devices of the DCN.

4. The communications apparatus of claim 3, wherein the power source comprises at least one of a battery, a fuel-based generator, solar panel, or a wind turbine.

5. The communications apparatus of claim 1, wherein the computing device is configured to calculate the utility score independently of other computing devices in the plurality of communication devices.

6. The communications apparatus of claim 1, wherein the computing device is further configured to access an algorithm to calculate the utility score from one of the plurality of communication devices via the transceiver assembly.

7. The communications apparatus of claim 1, wherein the plurality of communication devices comprises a network gateway or an additional communications apparatus.

8. The communications apparatus of claim 1, wherein the transceiver assembly is coupled to a building, and wherein the power source is independent of a power grid for providing electricity to the building.

9. The communications apparatus of claim 1, wherein the transceiver assembly is coupled to a vehicle, and wherein the power source comprises a battery for the vehicle.

10. An apparatus for communication over a distributed communications network (DCN) having a plurality of communication devices, the apparatus comprising:
    a transceiver assembly including a long-range transceiver configured to connect the plurality of communication devices within the DCN, each of the plurality of communication devices being configured to transmit data packets to a respective subset of the plurality of communication devices; and
    a computing device in communication with the long-range transceiver for transmitting parameters of a data routing algorithm to the plurality of communication devices, wherein the data routing algorithm causes the computing device to perform actions including:
        calculate a utility score for each communication device in the respective subset, wherein the utility score quantifies transmissibility of a data packet from the transceiver assembly to each communication device in the respective subset of communication devices, wherein the transmissibility is based on: a distance between the transceiver assembly and each communication device in the respective subset of the plurality of communication devices, a transmission queue at the transceiver assembly, a remaining life of a power source for the transceiver assembly, power consumption to transmit the data packet to each communication device, and a data throughput of each communication device, and
        generate instructions to transmit the data packet to at least one communication device in the subset based on the calculated utility score.

11. The apparatus of claim 10, wherein the long-range transceiver comprises a radio frequency (RF) antenna configured to transmit the data packet via the DCN, and wherein the DCN comprises a low-power wide-area network (LP-WAN).

12. The apparatus of claim 10, wherein the data routing algorithm causes each of the plurality of communication devices to calculate the utility score independently of each other.

13. The apparatus of claim 10, wherein at least one of the plurality of communication devices is coupled to a building, and is coupled to an additional power source independent of a power grid for providing electricity to the building.

14. The apparatus of claim 10, wherein at least one of the plurality of communication devices is coupled to a vehicle, and wherein a power source for the at least one of the plurality of communication devices comprises a battery of the vehicle.

15. The apparatus of claim 10, wherein at least one of the plurality of communication devices comprises an unmanned aerial vehicle (UAV).

16. The apparatus of claim 10, wherein at least one of the plurality of communication devices comprises a battery-operated portable transceiver.

17. A system for routing data through a distributed communications network (DCN), the system comprising:
- a transceiver assembly connected to a transceiver power source;
- a plurality of communication devices in communication with the transceiver assembly and distributed over a geographic area, each of the plurality of communication devices including:
  - a short-range transceiver configured to generate a local area network (LAN) for exchanging communications data between the transceiver assembly and at least one LAN device;
  - a long-range transceiver coupled to the transceiver assembly and configured to exchange data between the communications device and the transceiver assembly;
  - a device power source configured to supply power to the short-range transceiver and the long-range transceiver;
- a computing device connected to the transceiver assembly, wherein the computing device performs actions including:
  - calculating a utility score for each communication device of a subset of the plurality of communication devices, wherein the utility score quantifies transmissibility of a data packet from the transceiver assembly to each communication device of the subset of the plurality of communication devices, wherein the transmissibility is based on: a distance between the transceiver assembly and each communication device of the subset, a transmission queue at the transceiver assembly, a remaining life of the transceiver power source, power consumption to transmit the data packet to each communication device, and a data throughput of each communication device, and
  - generating instructions to transmit the data packet to at least one communication device in the subset based on the calculated utility score.

18. The system of claim 17, wherein the long-range transceiver of each communication device comprises a radio frequency (RF) antenna configured to transmit the data packet via the DCN, and wherein the DCN comprises a low-power wide-area network (LP WAN).

19. The system of claim 17, wherein at least one of the plurality of communication devices is coupled to a vehicle, and wherein the power source for the at least one of the plurality of communication devices comprises a battery of the vehicle.

20. The system of claim 17, wherein at least one of the plurality of communication devices is coupled to a building, and wherein the device power source is independent of a power grid for providing electricity to the building.

* * * * *